United States Patent Office 3,432,662
Patented Mar. 11, 1969

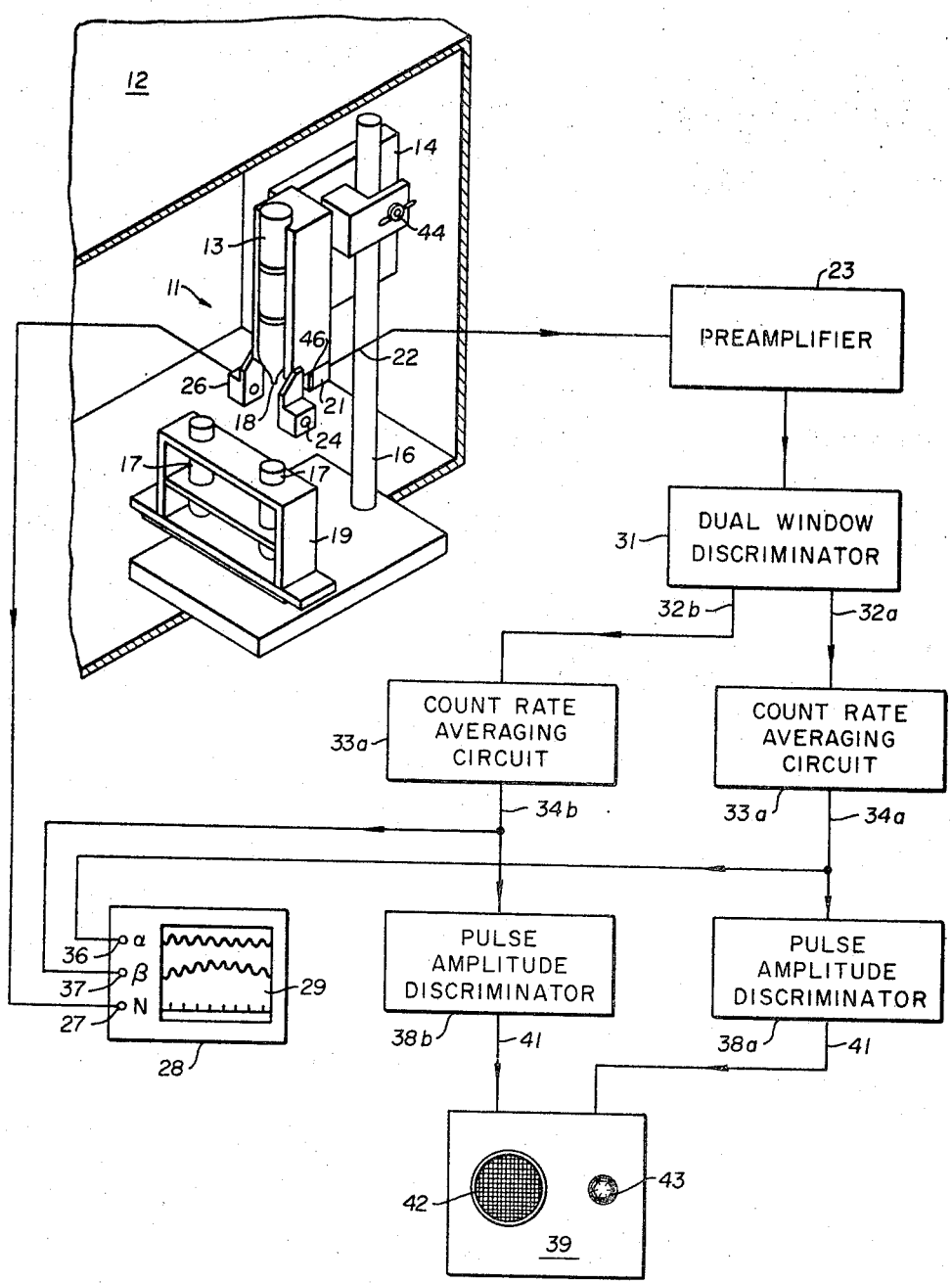

3,432,662
AUTOMATIC SEPARATION COLUMN PRODUCT ANALYZER
Robert J. Walker, Walnut Creek, Calif., assignor to the United States of America as represented by the United States Atomic Energy Commission
Filed Oct. 31, 1966, Ser. No. 591,378
U.S. Cl. 250—83.1
Int. Cl. G01t 3/00; H01j 39/32
2 Claims

ABSTRACT OF THE DISCLOSURE

An automatic separation column product analyzer comprising:
(a) a radiation detector movable along the length of said column;
(b) an amplifier;
(c) a pulse-height discriminator;
(d) a count rate averaging circuit; and
(e) signal amplitude indicating means.

---

The present invention relates to chemical separation column apparatus and more particularly to a radioisotope separation column for use in shielded cave chemistry. The device is designed for easy handling by slave manipulators and has means for providing remote and immediate assay of the separation products. The invention described herein was made in the course of, or under Contract W-7405-eng-48 with the United States Atomic Energy Commission.

In typical separation column processes, the column products must continually be sampled and analyzed in order to identify the occurrence of each new precipitate so that each precipitate may be collected separately. The continual sampling is tedious and time-consuming, requiring close monitoring by the technician. In radioisotope separations, which must be performed in isolation caves, the sampling is particularly cumbersome for the numerous samplings involve much awkward handling with the slave manipulators and the samples must be transported from the cave to the analyzing station. Also, where expensive substances are involved, the residue left in the many sampling cones can represent a significant economic loss in material.

The present invention eliminates the need for continuous manual sampling in radioisotope separation processes by employing a solid-state radiation detector at the column outlet to sense the radioactivity of the droplets eluted therefrom. The detector output is coupled through pulse analyzing circuitry external to the isolation cave to a strip chart recorder. The detector response is graphically presented on the recorder as a running alpha and beta count of the separation products. A change in either count rate is indicative of a new precipitate. The circuitry includes means for providing both an audio and a visual signal of such change in count rate to inform the column operator, who may now be otherwise occupied in the area, whereupon examination of the data appearing on the strip chart will indicate the optimum separation point at which to change the collector cones. The invention can also be adapted for use as a neutron counter in alpha and beta column chemistry.

Accordingly, it is an object of the invention to provide a more efficient means for separating tthe precipitates from a radioisotope separation column.

It is another object of the invention to provide a radioisotope separation column having means for automatically analyzing the separation products eluting therefrom.

It is a further object of the invention to provide a graphic record of the alphat and beta count rate of the precipitates from a separation column.

It is another object of the invention to reduce the number of slave manipulator operations required in alpha and beta column chemistry.

The invention, both as to its organization and method of operation, together with further objects and advantages thereof, will be best understood with reference to the following specification taken in conjunction with the accompanying drawing which is a perspective view of the separation column apparatus of the invention with the analyzing circuitry shown in block form.

Referring now to the drawing, the column apparatus 11 is shown disposed within a shielded cave enclosure 12 as is required for work with radioactive column chemistry. Such caves 12 are typically provided with slave manipulators (not shown) which are guided from outside the cave and with which all handling operations within the cave are performed. Thus, all the fixtures and mountings hereinafter described on the column apparatus 11 are of a size and simplicity to be easily handled by this technique. The separation column 13 is set in a holder mount 14 which is clamped to a stand 16 and positioned above a collector cone 17 to receive the separation droplets from the column orifice 18. A pair of such cones 17 are held in a slidable rack 19, the travel limits of which automatically center the cones 17 under the column 13.

A drop-detecting unit comprising a small light source 24 and a photocell 26 is mounted beneath the column outlet 18 with output signals from the photocell 26 being coupled out of the cave 12 to a drop-counting input terminal 27 of an ink chart recorder 28. Each droplet leaving the orifice 18 interrupts the light beam, thereby causing the photocell 26 output signal to momentarily decrease in amplitude, and thus causing a blip to be indicated on the drop count line N of the recorder strip chart 29.

A small solid-state silicon radiation detector 21 is affixed to the column mounting 14, immediately behind and beneath the column outlet 18, and has an output leading out of cave 12 to a pulse preamplifier circuit 23. When droplets pass the vicinity of the face of the silicon-chip detector 21, the alpha and/or beta radiations from the droplet produce electrical pulses at the detector output 22. The amplified detector pulses from preamplifier 23 are applied to a dual-window type pulse discriminator 31 within which the alpha and beta radiations of the column emission are identified and separated into respective channels of the subsequent output circuitry. Input pulses to the discriminator 31 having a pulse height above a certain predetermined amplitude level are characterized as alpha radiation signals and are made available at a first output terminal 32a of the discriminator. Input pulses below the same amplitude level are beta radiations and are available at a second discriminator output terminal 32b. The two output signals are then respectively coupled to separate count rate averaging circuits 33a and 33b. The averaging circuits 33 receive the incoming radiation counts and produce output signals indicative of the rate of radiation pulses received thereby, as will presently be described.

As each droplet forms at the column orifice 18 and is exposed to the silicon detector 21, the radiation count rises sharply until the fully-formed droplet falls and leaves the vicinity of the detector. The count rate then suddenly decreases until the subsequent droplet begins to emerge from the column outlet and the new drop volume of radioisotope is exposed to the detector 21. The number and relative proportion of alpha and beta radiation counts contained in each droplet will vary among the different precipitating constituents of the column liquid.

Thus, for example, a certain constituent may have a high alpha content. As this element precipitates in the column 13, it will appear only faintly in the droplets at first and then continuously increase in concentration as the constituent becomes more purely separated. Throughout the period of increasing concentration, the alpha counts emitted in the formation of each successive droplet will rise proportionately, thereby sending more pulses more rapidly to the alpha count rate averaging circuit 33a. Each burst of increasing pulses raises the average count rate and the output signal from the averaging circuit 33a exhibits a continuous rise in amplitude while also being superimposed with the individual count rate fluctuations from each droplet. As the particular precipitate subsides in concentration, the average alpha count rate will fall, or otherwise vary in accordance with the alpha content of the subsequently precipitating element.

Thus, by virtue of the differences in radioactivity among the various isotopes in the separation process, any shift in the base line of either one or both of the alpha and beta counting rates is indicative of a change in the precipitating product from the separation column 13. Accordingly, the outputs 34a and 34b of the count rate averaging circuits 33 are coupled respectively to an alpha input terminal 36 and a beta input terminal 37 of the pen chart recorder 28. In this way the alpha and beta radiations are continuously recorded on the strip chart 29 as separate graphs of the respective count rates versus time, and any change in the pulse amplitude base lines thereof may be readily observed.

In order to reveal the occurrence of such a shift in base line without requiring constant visual monitoring of the strip chart 29 by the column operator, the outputs 34a and 34b of the two count rate averaging circuits 33 are branched and respectively coupled through a pair of pulse amplitude discriminators 38a and 38b to an alarm system 39. If the average count rate signal to either or both of the discriminators 38a or 38b rises beyond a predetermined norm amplitude level the discriminator output 41 signal triggers the alarm system 39. The trigger pulse generates an audio signal from the alarm box speaker 42 and flashes an indicator light 43 thereon to inform the operator of the coming change in precipitate concentration from the column 13. Upon examining the radiation graphs of the strip chart 29, the operator can select exactly the desired transition point of the separation and then merely has to shift the collector rack 19 with the manipulators to position an empty cone 16 under the column outlet 18 for the new collection.

The fixtures and assembly of the column apparatus 11 are specifically arranged for accessibility and for easy operation by the slave manipulators. The detector 21 is spring-clamped to the column mount 14 and the mount 14 is readily positioned on the stand 16 by the large clamp screw 44.

Thus throughout the process of a column separation, the varying radiation levels indicated by the strip chart information essentially provide an automatic and remote monitor of changes in the column precipitates. By eliminating the laborious numerous collector cone exchanges previously required for sampling, the separation process time has been substantially reduced. For example, the separation of an 80 microgram slug of Californium 252 was formerly a three-week procedure requiring almost the full attention of the technician. With the present invention the period has been reduced to 52 hours and the operator is relatively free for other nearby activity. Furthermore, the waste of precipitate material through residue in the numerous sampling cones has been eliminated.

In addition to the described alpha and beta radiation analysis, the invention may be adapted to count neutron emission of the column constituents by inserting a polyethylene modulator 46 on the face of the detector 21. For some operations the adapted detector 21 is occasionally removed from the mounting 14 and passed along the length of the column with the slave manipulators to roughly locate the levels of the various precipitates coming down the column by virtue of the change in neutron count rate. In such usage the dual-window discriminator 31 is set to eliminate low amplitude noise signals from the detector output 22 and only the (alpha) output channel 32a is used. The chart recorder 28 is bypassed and the count rate change is indicated merely by the alarm system 29 or by an appropriate meter substituted therefor.

While the invention has been described as a qualitative instrument for use in radioisotope separation column chemistry, the adaptability and potential of the apparatus to tracer techniques in non-radioactive operations or to quantitative measurement is obvious. Accordingly, it will be apparent to those skilled in the art that numerous variations and modifications are possible within the spirit and scope of the invention and thus it is not intended to limit the invention except as defined in the following claims.

What is claimed is:
1. A means for locating the levels of precipitates in a radioactive chemical separation column, the combination comprising:
 (a) a solid-state radiation detector producing output signals in response to neutron emission from said column constituents and movable along the length of said column,
 (b) an amplifier coupled to the output of said radiation detector,
 (c) a pulse-height discriminator coupled to said amplifier and eliminating noise signals below a predetermined level from said detector output signals,
 (d) a count rate averaging circuit coupled to the output of said discriminator, and
 (e) signal amplitude indicating means coupled to the output of said averaging circuit.

2. Apparatus as described in claim 1 wherein said radiation detector is a silicon-chip detector with a polyethylene modulator disposed on the detecting surface thereof.

References Cited

UNITED STATES PATENTS

| | | | |
|---|---|---|---|
| 3,126,482 | 3/1964 | Brown et al. | 250—83.3 |
| 3,134,018 | 5/1964 | Schranz | 250—43.5 |
| 3,238,369 | 3/1966 | Kronenberg | 250—83.1 |
| 3,321,626 | 5/1967 | Allenden et al. | 250—83.3 |

ARCHIE R. BORCHELT, *Primary Examiner.*

U.S. Cl. X.R.

250—83.3